Feb. 28, 1956　　　　J. E. FINE　　　　2,736,154
MASTER DRAWBARS FOR HAYRAKES
Filed June 27, 1952　　　　3 Sheets-Sheet 3
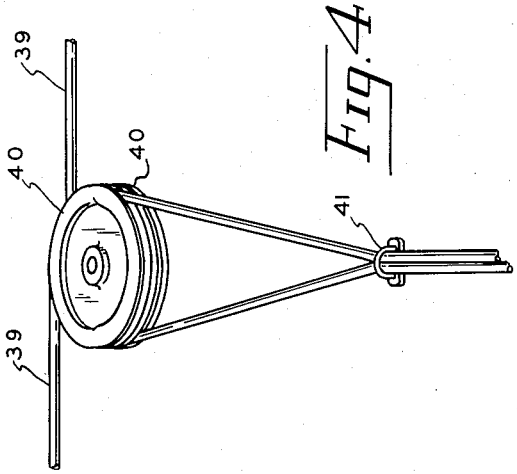
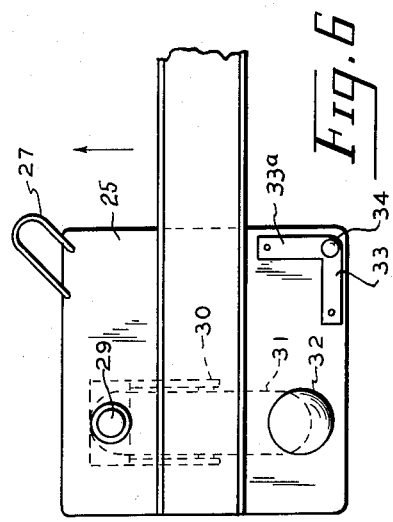
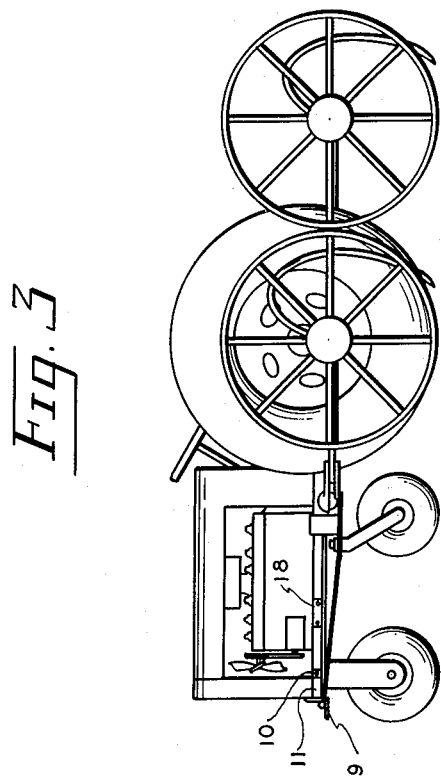
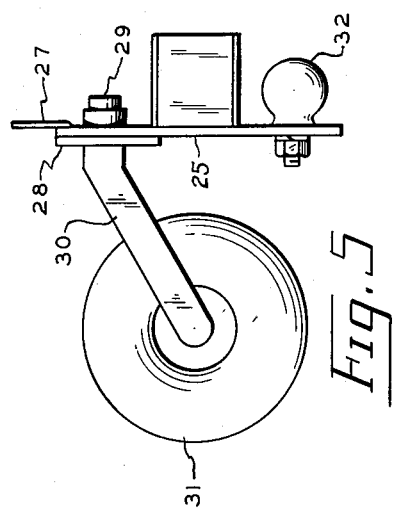
INVENTOR
JACK E. FINE
BY *Ralph J. Barrett*
ATTORNEY

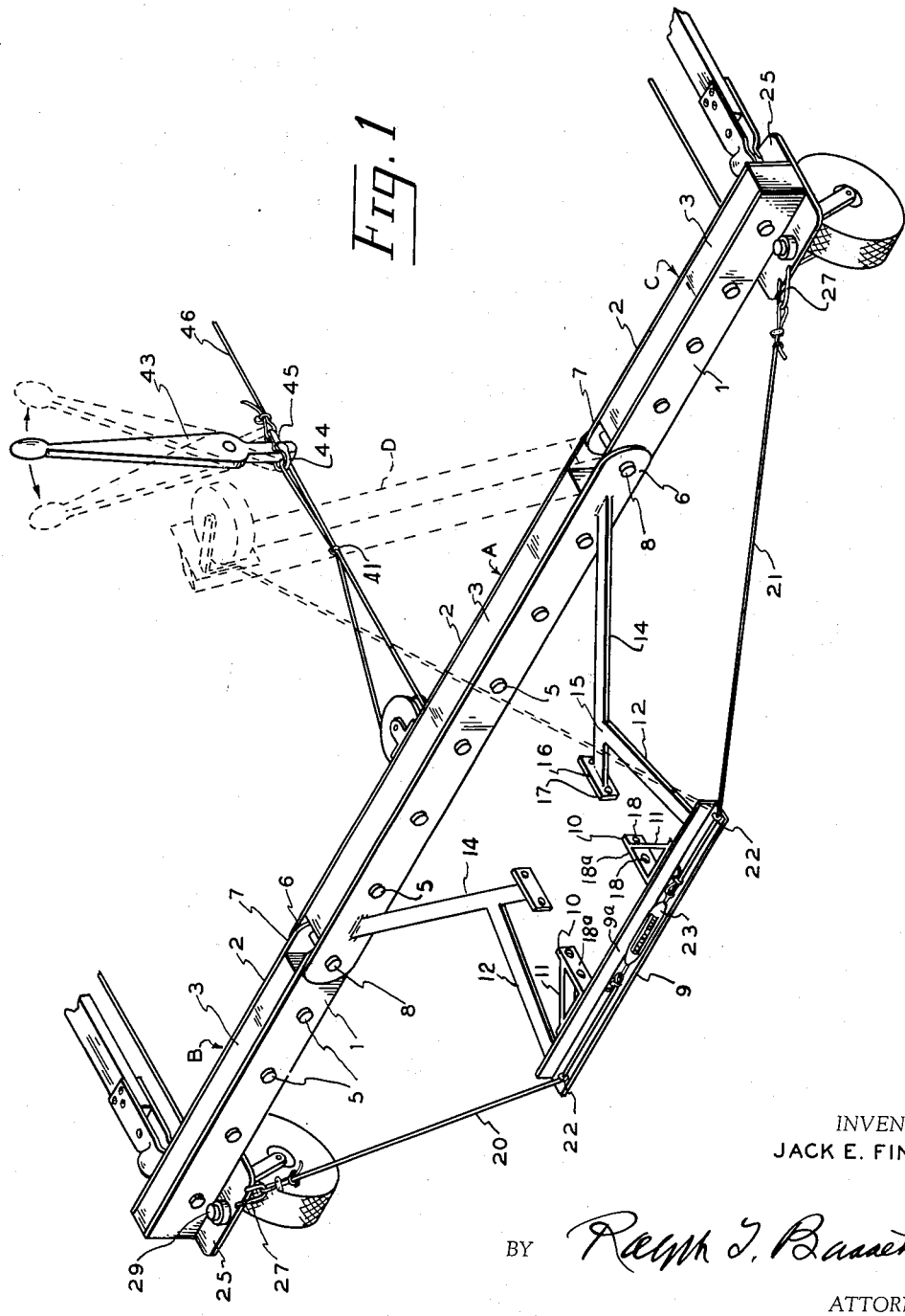

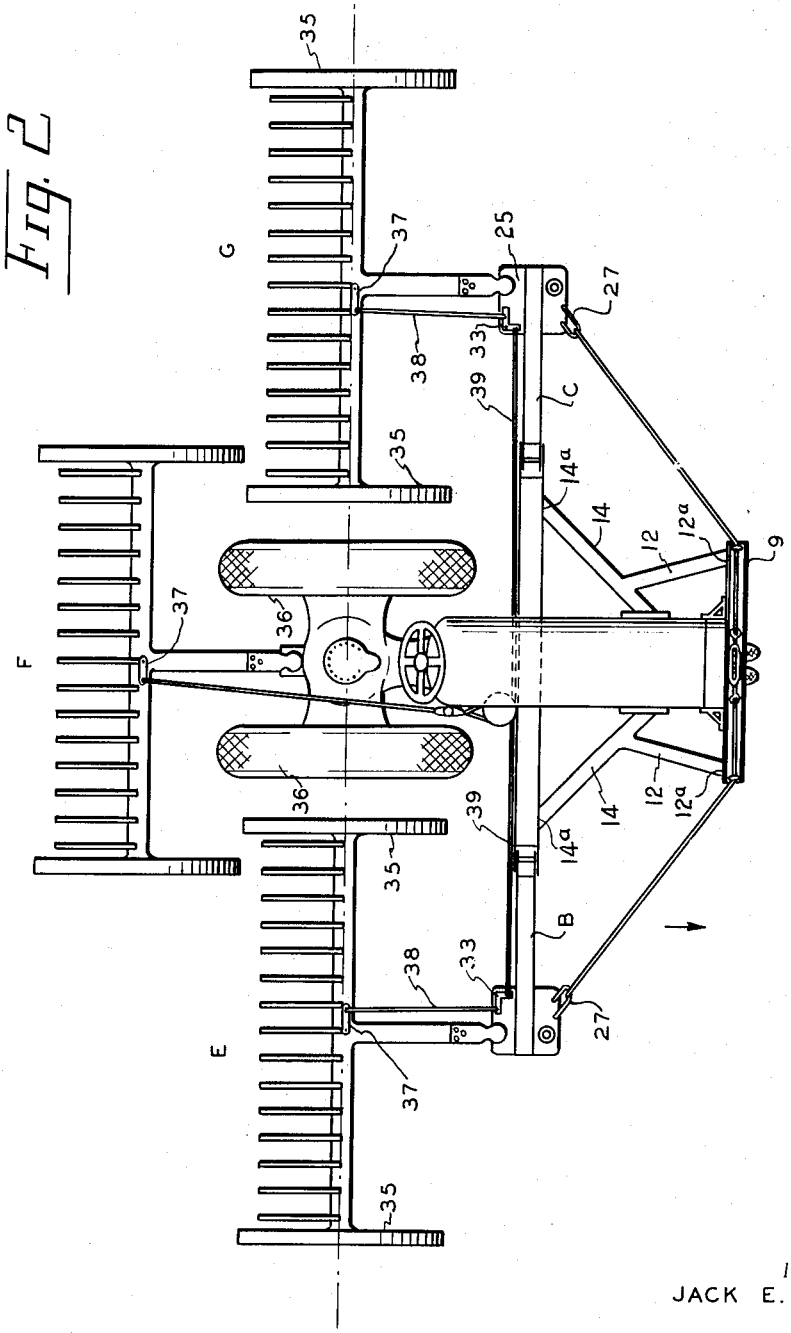

United States Patent Office 2,736,154
Patented Feb. 28, 1956

2,736,154

MASTER DRAWBARS FOR HAYRAKES

Jack E. Fine, Frenchglen, Oreg.

Application June 27, 1952, Serial No. 296,010

8 Claims. (Cl. 56—27)

This invention relates to a tractor attachment in the nature of a master drawbar to facilitate the use of a plurality of farm implements from a single source of power.

The object of this invention is to provide a drawbar assembly which can be detachably mounted on a tractor, the drawbar unit being sectional in form with its end sections hinged to permit their swinging movement within the width of the main drawbar section to permit movement of the assembly through a gate opening of normal width.

Another object of this invention is the provision of a sectional drawbar assembly capable of attachment to a standard tractor frame and in which the power from the tractor can be distributed to the sections of the drawbar to which independent implements have been attached to permit the arrangement and operation of a series of units from a common source of power.

Another feature of the invention is a control mechanism whereby a single lever may actuate the mechanism of a series of implements, either collectively or individually, the lever mechanism being positioned adjacent the operator's seat of a tractor to permit the manipulation of several mechanisms by a single operator.

The invention further includes the alignment and arrangement of a multiplicity of farm implements which are to be drawn from a single source of power such as a tractor, and in which most of the implements are arranged as wings from the power unit and with their wheel axles aligned with the wheel axles of the power unit to permit and insure proper turning of the winged units with the power unit which is medially arranged in connection therewith.

Other features of the invention reside in the specific structure of the sectional hinged drawbar and the mounting plates at the ends of the wing sections to permit the distribution of power and to facilitate the mounting of the control mechanisms to the parts of the assembly.

Other objects of the invention will more fully hereinafter appear by reference to the accompanying drawings forming a part of the instant application wherein like characters of reference designate corresponding parts throughout the several views, in which:

Fig. 1 is a perspective view showing the drawbar assembly and mounting therefor;

Fig. 2 is a top plan view showing three hay rakes connected to the assembly of the present invention;

Fig. 3 is a side elevation of the parts shown in Fig. 2;

Fig. 4 is an enlarged perspective view of distributing pulleys for the control cables;

Fig. 5 is an enlarged side elevation of one of the supporting plates; and

Fig. 6 is an enlarged top plan view of the structure of Fig. 5.

Referring first to Fig. 1, the drawbar is shown as formed of an intermediate section A, and end sections B and C. Each of these sections is of laminated form and include outer side metal plates 1 and 2, with intermediate fillers of wood or other suitable material indicated by reference character 3. The parts of the various sections are secured together by bolts or other suitable fastening means 5 and the outer metal plates 1 and 2 of the center section A project at each end as at 6 for embracing the projections 7 of the outer metal plates 1 and 2 of the end sections B and C. Transverse horizontal hinge pins 8 connect the vertical metal walls of the drawbar sections and permit the end wing sections B and C to swing upwardly and inwardly as indicated in dotted lines at D. The center drawbar section A is designed to be supported by a generally rectangular metal frame, the front of which is of angle iron form as shown at 9 with the vertical arm 9a of the angle positioned inwardly and extending upwardly from the horizontal portion of this member for purposes which will more clearly hereinafter appear. Angle brackets 10 having diagonal braces 11 project inwardly from the upright portion of the angular frame member 9 and are suitably spaced to embrace a side frame of a tractor unit. The front angle member 9 is connected to the center drawbar section A by diagonal brackets 12 and 14 which are connected respectively to the angle member 9 and the drawbar section A adjacent their end portions 12a and 14a. The angle brace 12 merges with the angle brace 14 adjacent its outer end at 15, and the brace 14 at its extremity terminates in connector plates 16 having suitable bolt holes as shown at 17. Similar bolt holes 18 are provided in the angle brace 18a for bolting the assembly to the tractor frame, the connecting plates 10 and 16 being adapted to be secured through the bolt holes and by means of suitable bolts to the side frame of the tractor at each longitudinal side of the engine. This supporting structure provides an extremely rigid mount for the assembly which can be readily positioned about the tractor power plant and clamped to the tractor frame with the center drawbar section A medially aligned with respect to the engine so that the ends of the drawbar section A extend beyond the tractor an equal distance on each side of the power plant to facilitate the distribution of power to the various implements and to permit the ready handling and movement of the tractor through gate openings when the wing drawbar sections B and C are swung upwardly.

Inasmuch as the draft from the tractor is applied from the front of the tractor unit through the angle member 9 and through the supporting framing to the medial drawbar section A, this angle member 9 is used as a guide for the sectional draft cables 20 and 21. These cables 20 and 21 extend through guide rings or eyes 22 in the horizontal leg of the angle member 9 and are connected by the turnbuckle 23, which latter is used to tighten or loosen the cables 20 and 21 as may be required to keep the drawbar sections in alignment under draft and to thereby relieve the strain from the hinge joints of the drawbar sections.

The ends of each of the free wing sections B and C of the drawbar overlie and are secured to and support end plate members 25, both of these plate members being substantially identical and projecting forwardly and rearwardly of the drawbar for the mounting of parts as to be hereinafter described, and for connection with the cables 20 and 21, the latter being secured to forwardly projecting metal loops 27, these loops being of inverted U-form with their terminals extending through spaced holes formed in plates 25 and being bent forwardly into substantially the normal angles of the cables 20 and 21.

Referring particularly to Figs. 5 and 6, it will be seen that the forward portions of the plates 25, i. e. the portions which extend forwardly of the drawbar sections B and C, are reinforced by additional plates 28 and through this reinforced portion the studs 29 of the swivel mounts 30 project and are secured, the swivel mounts 30 being provided with suitable casters or wheels 31 in the usual manner. Detachable ball members 32 are bolted through the rear projecting portions of the plates 25 to cooperate with the coupling sockets of the draft bars of hay rakes or any other farm implements which are to be utilized in connection with the appaartus. At the rear inner corners of the plates 25 are bell cranks 33 pivoted at 34 for connection with the control cables as will be hereinafter more fully described.

In the present disclosure the invention is illustrated as connected to and operably used with the conventional hay rakes (shown in United States Patent 2,088,809) indicated in Fig. 2 by reference characters E, F and G, the outside or wing rakes E and G being connected through the ball and socket connections with the wing sections B and C of the drawbar, while the center rake F is centrally positioned with respect to the tractor and is positioned rearwardly thereof in the usual manner for hooking a single implement with a tractor. It will be noted that the wing rakes E and G have their wheels 35 with their axles in axial alignment with the axles of the rear wheels 36 of the tractor, this arrangement insuring proper control of the wing rakes E and G at all times and particularly in turning. It will also be noticed that the center rake F projects outwardly from the inner wheels of the wing rakes E and G to insure a complete and continuous raking action throughout the length of the assembly. The hay rakes E, F and G shown are of conventional form and are normally provided with means to permit the tongs to swing upwardly when loaded, whereby the accumulated hay or other material is freed from engagement with the tongs which override the load and return to raking position. This conventional operation of the hay rakes E, F and G is actuated by a tripping mechanism through a lever and such a lever is indicated generally at 37, shown pivoted substantially medially of the frame of each of the rakes. Cables or rods 38 connect each of the tripping levers 37 of the wing rakes E and G with one arm of the bell crank 33 heretofore described and shown more clearly in Fig. 6 of the drawings. The other arm 33ª of each bellcrank lever is connected with a cable or rod 39, each of which passes over a grooved pulley 40 as shown in Fig. 4, each cable traveling partially about one of the pulleys, and the pulleys being axially superimposed so that the cables 39 passing about the independent pulleys are brought forward through the guide ring 41 and connected at the bottom of the lever 43 to a ring link 44 whereby the forward movement of the lever will pull the cables, and through the linkage and connections shown operate the tripping mechanism to the wing rakes E and G. At the opposite side of the lever 43 is an additional link 45 which is connected by a cable 46 to the trip lever mechanism 37 of the center rake F. By this means the forward movement of the lever 43 will trip the side or wing rakes E and G and the rearward movement of the lever will trip the following central rake F. This permits the release of the rakes at a common line of discharge which is usually desirable in raking operations.

What I claim is:

1. A master drawbar assembly for use with a tractor having a frame, said assembly including a transverse end member for connection with one end of the tractor frame and another spaced parallel end member forming a medial section of the drawbar, said spaced parallel members being connected by spaced pairs of diagonal brackets secured together at their inner intersecting ends, connector plates supported by said brackets and said first-mentioned end member, said connector plates being arranged for supporting engagement with said tractor frame, vertically swinging wing members connected to the ends of the medial section of the drawbar, end plate members secured to the bottom face of the free ends of the drawbar wing members and extending forwardly and rearwardly thereof, caster elements supporting said wing portions and carried by said plates, coupler elements connected to the forward ends of said end plates, and an adjustable cable connecting the first transverse end member of the assembly with said end plates.

2. The structure of claim 1 characterized in that the adjustable cable connecting the first transverse end member of the frame with the end portions of the drawbar wings include cable sections connected at their outer ends with said wings and connected together by a turnbuckle.

3. The structure of claim 1 characterized in that the transverse element at the front of the tractor is in the form of an angle bar, the bottom leg of which forms a guide for the adjustable cable.

4. The structure of claim 1 characterized in that the drawbar sections are of laminated construction including spaced metal plates and intermediate fillers.

5. The structure of claim 1 characterized in that the drawbar sections are of laminated form and include spaced metal plates having projecting end portions hinged together by horizontal pins.

6. In combination with a wheel mounted tractor, a sectional master drawbar for use with said tractor including a central portion fixed to the tractor and vertically swinging wing sections, means for connecting the wing sections with the tractor frame for applying draft forces thereto, a pair of rake elements connected by drawbars to said wing portions, said rakes being wheel mounted and having the axes of the axles of the wheels aligned with the drive axle of the tractor, a drawbar connected medially of the tractor and extending rearwardly thereof, a rake connected to the draft element, release means for the rakes, a lever, actuating means for the release means of the axially aligned rakes connected to the lever for operation upon movement of the lever in one direction, and means connecting the release means of the rear rake to the lever for operation upon movement of the lever in the opposite direction.

7. The structure of claim 6 characterized in that the actuating means for the release means includes cables connected to bellcrank levers, the bellcrank levers being supported at the outer ends of the wing sections of the drawbar.

8. The structure of claim 6 characterized in that plates are supported at the bottom portion of the outer ends of the wing sections of the drawbar, said plates extending forwardly and rearwardly of the drawbar and mounting thereon bellcrank levers which form portions of said actuating mechanism.

References Cited in the file of this patent

UNITED STATES PATENTS

| | | |
|---|---|---|
| 1,148,791 | Nelson | Aug. 3, 1915 |
| 1,237,616 | Clark | Aug. 21, 1917 |
| 1,563,878 | Stanek | Dec. 1, 1925 |
| 1,878,346 | Swanson | Sept. 20, 1932 |
| 2,066,537 | Murphy | Jan. 5, 1937 |
| 2,068,191 | Murphy | Jan. 19, 1937 |
| 2,088,809 | Peter | Aug. 3, 1937 |
| 2,125,014 | Christiansen | July 26, 1938 |
| 2,223,134 | Schruth | Nov. 26, 1940 |
| 2,465,620 | Wait | Mar. 29, 1949 |
| 2,592,841 | Acton | Apr. 15, 1952 |
| 2,620,200 | Anderson | Dec. 2, 1952 |